United States Patent

[11] 3,560,647

[72] Inventor Leon D. Harmon
Watchung, N.J.
[21] Appl. No. 708,639
[22] Filed Feb. 27, 1968
[45] Patented Feb. 2, 1971
[73] Assignee Bell Telephone Laboratories Incorporated
Murray Hill, N.J.
a corporation of New York

[54] AUTOMATIC FOCUSING SYSTEM
8 Claims, 3 Drawing Figs.

[52] U.S. Cl. .......... 178/7.2, 352/140; 353/101
[51] Int. Cl. .......... G03b 3/02
[50] Field of Search .......... 178/7.2E, 5.4, 5.2, 7.3D, 7.3E; 352/140; 353/69, 101; 250/204

[56] References Cited
UNITED STATES PATENTS
3,450,883 6/1969 Thomas .......... 353/101

*Primary Examiner*—Robert L. Griffin
*Assistant Examiner*—John C. Martin
*Attorneys*—R. J. Guenther and William L. Keefauver

ABSTRACT: A projected image may be brought into focus automatically by sensing a reflected image, e.g., with an electronic camera, and responsively adjusting the projector focus until an examination of the image denotes the greatest signal content. However, colorblind image dissectors fail to distinguish between image structures possessed of equal brightness characteristics but of different hues. By using separate spectrally sensitive channels, information about color as well as brightness transitions is made available for analysis. As a result, finer resolution sensing and optimum dissection is achieved.

INVENTOR
L. D. HARMON
BY G. E. Hirsch
ATTORNEY

AUTOMATIC FOCUSING SYSTEM

This invention relates to the automatic focusing of optical systems and, more particularly, to improved systems for automatically focusing color slide projectors or the like.

BACKGROUND OF THE INVENTION

The quality of performance of a projector used for the display of color slides, or the like, is dependent largely upon the accuracy with which the image is focused on a viewing screen. To maintain a display of high resolution, focus must be continuously adjusted to compensate for minute variations in the spatial relationship between the slide and lens system. Moreover, variations in slide dimensions require that the system focus be individually focused for each slide projected.

1. Field of the Invention

In simple projection systems, of the sort generally used for home entertainment, focus has generally been adjusted manually. In the more complex equipment, such as that used commercially in display applications and recently in home projectors, an arrangement for automatically maintaining "-focus" is relatively common.

2. Description of the Prior Art

"Automatic focusing" arrangements for slide projectors have in practice followed one of two avenues of approach. In the first, and simplest, a sensing arrangement is employed for observing the physical position of the slide with regard to a datum point in the projection system, and for maintaining that relation despite the changes occasioned, for example, by "-popping" of the slide as it is heated. Typically, a photocell system is arranged to detect the angle at which a beam of light is reflected from the slide.

In more complex arrangements, the image displayed on the viewing screen is examined directly. In these systems, an auxiliary camera views the display, analyzes it for some indicia of focus, and alters the focus adjustment in accordance with the analysis. The signal analysis may rely solely on the amplitudes of selected frequency components rely solely on the amplitude of an average image signal, or preferably, on the amplitudes of selected frequency components of the imaged scene. Systematically, the lens of the projector is moved through its focusing range until the amplitude of the selected image component is maximized. Proper focus is thus maintained by sensing spatial frequency components of a projected image and using the resultant signal in a servo system which controls a projector lens positioner. Maximum sharpness is coincident with a maximum in the high-frequency content of the derived signal.

The precision of focus depends critically on the fineness of image dissection; the more highly resolved the dissected image, the better the sensing of the high-frequency components and, hence, the sharper the focus. Additionally, as dissection resolution increases, the degree of required lens hunting movement, or dither, is reduced.

A typical image dissector employs an aperture scanner, or the like, for exposing a photosensitive element to selected small areas of the projected image. Light intensity variations are converted by the photosensitive device into proportional voltages containing amplitude and frequency components in direct proportion to projected image sharpness. These signals are used to adjust the lens system of the projector.

Since, however, there is no differential spectral sensitivity in such a dissector system, a difficulty arises. Image structures which contain equal-brightness components, but different hue areas, do not produce a satisfactory output signal. For example, if the aperture scans an edge in the image which joins two spectrally different areas of equal brightness, the edge is not sensed, and the high frequency components characteristic of a sharp edge are not produced. Consider, as an extreme example, the image of a multicolored checkerboard in which each square has the same luminous intensity. A photocell with a spectrally flat response will yield a DC output, independent of focus; hence, no correcting signal is produced, and automatic focusing is impossible. A photocell with a nonflat spectral response produces some useful information, but in general the amplitude of the spatial derivative signal is low.

This leads to a second difficulty encountered in such systems; signal level is at a premium since the accuracy of focus adjustment depends on the smallness of the scanning aperture.

It is thus the object of the present invention to develop sensing information that is independent of both the hue and brightness composition of an image and to maximize sensed signal amplitudes for a given aperture size.

SUMMARY OF THE INVENTION

These and other objects are achieved in accordance with the invention by examining a number of spectrally distinct images and determining the proper focus adjustment in accordance with an analysis of the composite image signal. In one example of practice, three photosensitive elements, each responsive to one of the primary colors, are used to sense the projected image. THe control signals produced from each primary color analysis are selectively combined and used to develop a single control signal representative of overall image sharpness. Thus, in accordance with the invention, spectral as well as intensity changes contribute to the development of a control signal. Consequently, a larger control signal is developed, and focus error is diminished for a given dissection aperture size. Moreover, since the spectrally sensitive image detectors respond to color transitions between adjacent areas of equal brightness, there is an increased differential signal output where hue and intensity both vary over the image plane.

The invention will be fully apprehended from the following detailed description of a preferred illustrative embodiment thereof taken in connection with the appended drawings.

Figure 1:
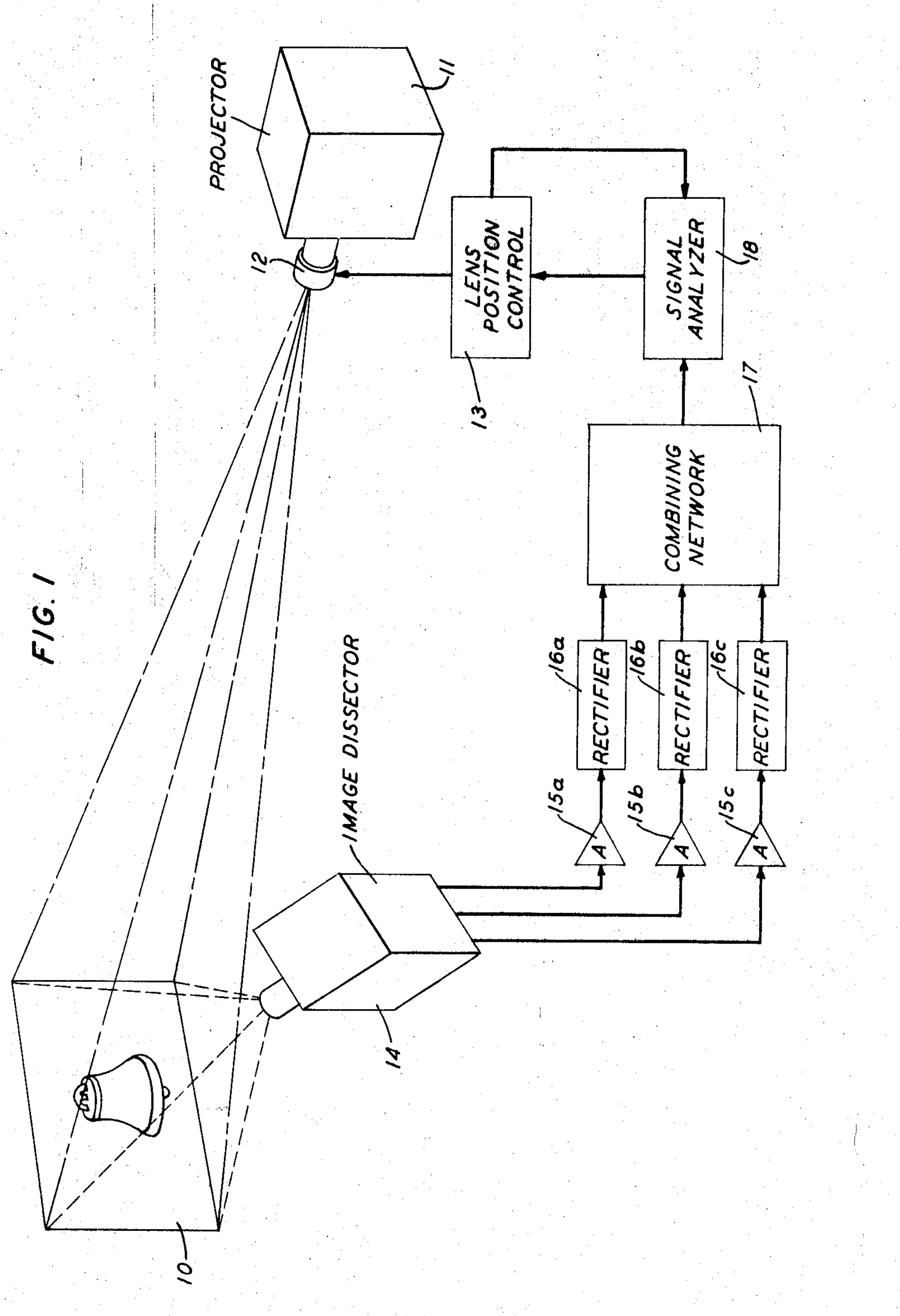
FIG. 1 is a schematic illustration of an automatic image focusing system in accordance with the invention.

In the projection system illustrated in FIG. 1, an image is displayed on screen 10 by projector 11. Projector 11 may be of any desired construction and typically is equipped to project positive image slides or the like by way of adjustable lens 12. Focus of the image on the screen is brought about by transverse adjustment of lens 12. For example, the lens may be adjusted remotely by means of lens position control 13 coupled to lens 12. In typical projectors available commercially, lens control 13 is actuated by an applied signal and serves to rock the lens back and forth, under control of an operator, until the proper focus is achieved.

In accordance with this invention, focus is continuously and automatically adjusted without human intervention. The image on screen 10 is viewed by image dissector 14, which may be of any desired construction. In essence, dissector 14 constitutes a photoresponsive system arranged to examine spatially distinct regions of screen 10 in a prescribed manner or order. In its simplest form, photocell apparatus or the like is exposed to the image on screen 10 through the scanning aperture of a Nipkow disc or the like. Of course, any other scanned photosensitive system, such as a television camera, may be employed.

Image dissector 14 is arranged to develop a plurality of spectrally separate image signals, for example, by means of a plurality of separate detectors responsive to different spectral regions of the image. Spectrally distinct regions, representative of light intensity variations, are developed which contain amplitude and frequency components in direct proportion to projected image sharpness. In a preferred form of the invention, three channels are used, one for each of the primary colors. Thus, spectral as well as intensity changes in the image contribute to the dissected information. The separate channel signals are amplified, as required, in AC coupled amplifiers 15*a*, *b*, *c*, and delivered by way of rectifiers 16*a*, *b*, *c*, to combining network 17. The composite signal developed by network 17 constitutes a control signal (of greater amplitude than a colorblind dissection signal), which denotes image transitions even between equal-brightness areas of different hue.

The composite signal is supplied to signal analyzer 18 equipped, for example, with a peak detector or the like. Consequently, analyzer 18 develops a signal representative of the peak amplitude components of the image signal. The sharper the image, the greater the amplitude of the peak signals. Hence, optimum focus yields the greatest output signal from analyzer 18. This control signal is applied to lens position control 13 and utilized to adjust focus of projector 11. To assure proper focus, a signal representative of the lens position is supplied by control 13 to analyzer 18. In the usual fashion, the feedback signal establishes a sufficient differential signal to permit "dither" of the lens in order that the peak signal is continually supplied to control 13.

Figure 2:
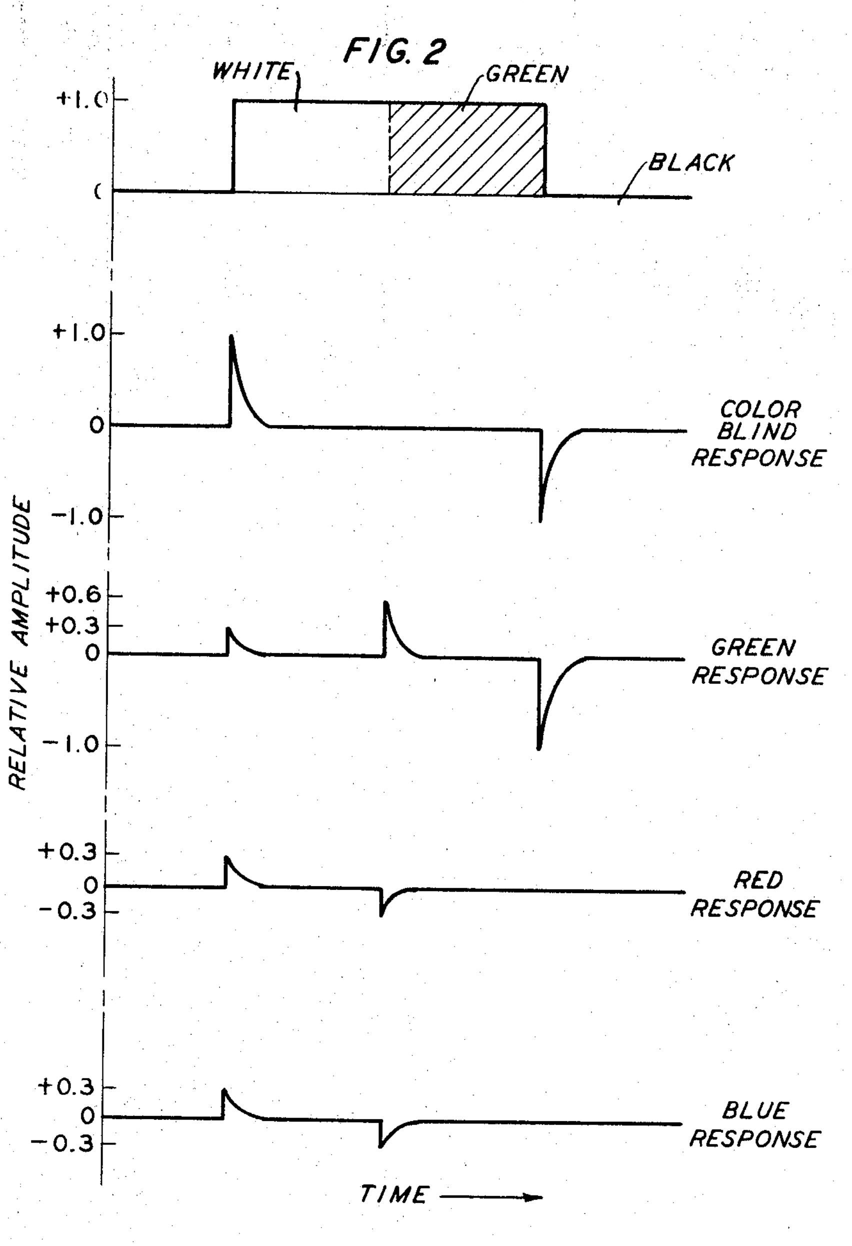
FIG. 2 illustrates the response, to a transition between two image areas of equal intensity but different hue, of a system responsive to intensity changes only, and of the multihue responsive system of the present invention.

FIG. 2 illustrates the reaction of a colorblind system and of a system in accordance with this invention to an image area which contains a change of hue but no intensity change. In this example, an image area includes a white segment and a green segment. The two segments are of equal intensity. When viewed with a dissection system which is not responsive to changes in hue, only the transition from black to white and the transition from green to black produces a signal output, as shown in the second line of the FIG. The change of hue provides no additional information. Yet, separate color responsive detectors sense the transition from black to white, white to green, and green to black. Line 3 of the FIG. illustrates the green channel response, line 4 the red channel response and line 5 the blue channel response. Thus, in general the multihue responsive system of the invention yields an increased differential signal resulting from changes in both hue and intensity over the image plane.

Figure 3:
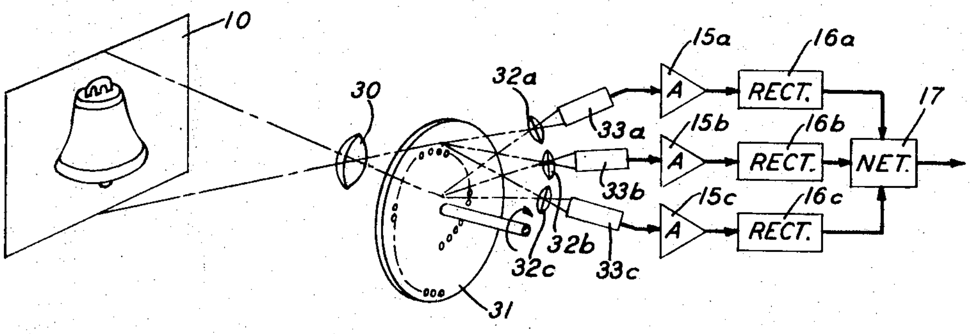
FIG. 3 is a schematic representation of an image dissector suitable for use in the practice of the invention.

FIG. 3 illustrates a typical image dissection system (corresponding to 14 in FIG. 1) suitable for use in the practice of the invention. The image on screen 10 is focused, for example, by lens system 30 on an image plane at the surface of Nipkow disc 31. As disc 31 rotates, small area portions of the image are passed through the scanning aperture(s) of the disc and focused by means of lenses 32*a*, *b*, *c*, on individual photodetectors 33*a*, *b*, and *c*. Each photodetector is equipped, for example, with a color filter or the like, to respond to one color only. The signals produced by the photodetectors are amplified and rectified individually and then combined in network 17 in the fashion described above.

It will be apparent to those skilled in the art that any image dissection arrangement for developing spectrally distinct image signals representative of scanned areas of the viewed image may be employed in the practice of the invention. Moreover, any arrangement of photodetector apparatus may be employed to develop a composite signal. Similarly, the control signal may be used in any desired fashion to alter the focus adjustment of slide projector 11. Numerous modifications of the representative systems described herein will occur to those skilled in the art, and such modifications may be made without departing from the spirit and the scope of the invention.

I claim:

1. An automatic focus control system, which comprises:
- adjustable means for controlling the focus of a projected image;
- means viewing said image for developing a plurality of control signals, each of which is representative of a different spectrally distinct range of said projected image;
- means for selectively combining said plurality of control signals; and
- means for supplying said combined signal to said adjustable means for controlling the focus of said projected image.

2. In an adjustable image focus system, the combination of:
- adjustable means for controlling the focus of an image;
- means for developing an electrical signal counterpart of said image;
- means responsive to said electrical signal counterpart for developing a plurality of control signals representative, respectively, of selected intensity in each of a plurality of different spectral color ranges of said image; and
- means for using said plurality of control signals for adjusting said focus controlling means.

3. An automatic focus control system, which comprises:
- adjustable means for controlling the focus of an image;
- means for systematically scanning said image to produce a plurality of signals representative of spectrally separate ranges of said image;
- means for analyzing said signals to develop control signals representative of peak amplitude components therein; and
- means for utilizing said control signals to adjust such focus control means.

4. An automatic focus control system as defined in claim 3 wherein:
- said system for systematically scanning said image comprises;
- a plurality of color selective photosensitive elements, and means combining signals produced from image representations developed by said photosensitive elements; and
- Nipkow disc scanning means interposed between said image and said photosensitive elements.

5. An automatic focus control system, which comprises:
- adjustable means for controlling the focus of an image;
- means for systematically dissecting said image to produce a plurality of spectrally separate image signals; and
- means responsive to said image signals for adjusting said focus control means to maximize the amplitude of said signals.

6. An automatic focus control system as defined in claim 5 wherein:
- said means for systematically dissecting said image comprises;
- a plurality of photosensitive elements responsive, respectively, to distinct spectral color image ranges; and
- means for selectively combining image values developed by said photosensitive elements to form a composite signal.

7. An automatic focus control system as defined in claim 5 wherein, said photosensitive elements are responsive, respectively, to the spectral ranges of the primary colors.

8. In a system for focusing an image, the combination of:
- means for projecting an image on a screen;
- adjustable means for controlling the focus of said image;
- means for systematically examining the image on said screen to produce a plurality of signals representative of the intensity of spectrally distinct color ranges of said image;
- means for combining said plurality of signals to form a composite signal;
- means for analyzing said composite image signal to develop a signal representative of peak amplitude components thereof; and
- means responsive to said peak amplitude components for adjusting said focus to maximize said peak amplitude signal.